Sept. 14, 1965 A. MEYER ETAL 3,206,088

METHOD FOR DIVIDING SEMICONDUCTOR PLATES INTO SMALLER BODIES

Filed Nov. 13, 1962 3 Sheets-Sheet 1

METHOD FOR DIVIDING SEMICONDUCTOR PLATES INTO SMALLER BODIES

Filed Nov. 13, 1962 3 Sheets-Sheet 2

3,206,088
METHOD FOR DIVIDING SEMICONDUCTOR PLATES INTO SMALLER BODIES

August Meyer and Werner Steger, Munich, Germany, assignors to Siemens-Schuckertwerke Aktiengesellschaft, Berlin-Siemensstadt and Erlangen, Germany, a corporation of Germany Filed Nov. 13, 1962, Ser. No. 236,872
Claims priority, application Germany, Nov. 10, 1961, S 76,635
3 Claims. (Cl. 225—2)

Our invention relates to methods and means for dividing semiconductor plates into smaller bodies of predetermined dimensions for use as semiconductor members in electronic devices. Such plates and members may consist of crystalline, preferably monocrystalline substance such as germanium, silicon or an intermetallic compound, for example indium antimonide, indium arsenide, gallium phosphide or other compounds of the $A^{III}B^{V}$ group. As a rule, such semiconductor plates of relatively large area are cut from rods or dendritic ribbons and may then be subjected to lapping or etching or both for giving them a predetermined, accurate thickness. Thereafter the relatively large plates are prescored on one surface by a cutting, scratching or notching tool whereafter the plates can be broken along the resulting severance traces into the small-area plates of the ultimately required dimensions.

Our invention, in a more particular aspect, relates to methods and means for performing the just-mentioned dividing operations and has for its object to simplify the subdividing processes and to improve the accuracy of the resulting products.

Another object of our invention is to afford simultaneously producing the severance traces on a number of plates held on a carrier, and to perform the subsequent breaking operation while the pre-scored plates are still held on the carrier; and it is a further, conjoint object to afford leaving the resulting small bodies, then available in the correct ultimate size, on the carrier for storing purposes or, if desired, for jointly subjecting them to additional processing.

Still another object of our invention is to afford readily removing the severed small-area plates from their common carrier in a particularly simple manner.

To achieve these objects, and in accordance with a feature of our invention, we employ a deformable foil coated on one side with an adhesive as a carrier for a number of large-area semiconductor plates previously prepared to have the desired accurate thickness, and we attach the plates to the carrier foil simply by pressing them against the adhesively coated surface. Thereafter we subject the exposed surfaces of the plates to notching, cutting, scratching or the like trace-producing operations, giving the resulting scores or severance traces a pattern of distribution corresponding to the size and perimetric shape of the individual semiconductor bodies to be obtained. After thus pre-scoring the adhering plates, we break the plates along the traces by subjecting the foil to deformation.

One way of doing this is to employ a carrier foil of sufficiently small thickness, for example about 0.2 mm., so that it can readily be bent. Since this foil, if unsupported is rather flaccid, we place the foil on a suitable surface of a rigid support structure before attaching the semiconductor plates to the adhesively coated surface. After the plates are scored by the above-mentioned pattern of severance traces, the foil is removed and subjected to bending deformation with the result that the plates will break along the severance traces.

Another way of subjecting the carrier of the plates to deformation is to make the foil of swellable material that can be caused to shrink or expand for imposing the necessary breaking stresses upon the plates. This requires using relatively thick carrier sheets instead of the above-mentioned thin foils for adhesively supporting the semiconductor plates. When using a bendable foil and breaking the plates by bending deformation of the foil, the rigid support used beneath the foil when the semiconductor plates are pressed against the adhesive surface may consist of an auxiliary table member inserted into a scoring device in a given position in which the severance traces are properly machined into the exposed surfaces of the semiconductor plates. According to a more specific feature of our invention, such an inserted auxiliary table plate is preferably so designed that it can be inserted into the device in respectively different directions, for example 90° displaced from each other, in accordance with the direction of the severance traces to be produced on the semiconductor plates.

According to another feature of our invention, the necessity for thus changing the position of the table plate can be obviated by mounting the carrier of the table plate in the scoring device in such a manner that the table plate can be rotationally displaced to respectively different positions with respect to the tracing direction of the scoring tools. As a rule, it is preferable to employ diamond scoring tools having a correspondingly ground cutting edge for producing the severance traces. Tools of this kind have been used for cutting semiconductor crystals and are capable of producing scores of high quality and accuracy in the surface of such crystalline plates.

As mentioned, after the severance traces are machined into the plates, the foil is removed from the rigid support or table member to which it was previously clamped or otherwise fastened. Since the removed foil can readily follow any bending forces, the scored semiconductor plates can now be broken into small bodies of the desired accurate shape. Such breaking operation could be performed by hand in a manner similar to that employed when breaking the glass pane previously scratched by a diamond or other glass-cutting tool. However, for economical and reliable production in industry, the breaking operation is preferably performed by placing the foil upon a soft pad of suitable thickness with the exposed surfaces of the attached plates facing the pad, and passing a roller under pressure over the rear side of the foil, or vice versa. During such relative roller motion the roller axis is preferably held parallel to the severance traces on the semiconductor plates to be broken, so that whenever the roller passes over a severance trace, the pressure exerted upon the semiconductor plate tends to bend the plate and, due to the brittleness of the semiconductor material, then causes the plate to break along the trace.

As mentioned, the deformation of the carrier foil or sheet required for breaking the semiconductor plates into smaller bodies along the severance traces may also be effected by expansion or shrinking if a carrier foil or sheet of swellable material is employed. After scoring the plates, the carrier foil together with the adhering semiconductor plates is placed into a bath of swelling medium so that the material of the carrier foil is soaked and swells. Due to the resulting expansion of the carrier foil a corresponding tensile or bending stress is produced at the scores for thus breaking the semiconductor plates. The amount of tensile or bending force depends upon the degree of swelling. For that reason a sufficient force requires giving the foil or sheet a corresponding minimum thickness. The carrier foil or sheet may also be laminated of two sheets firmly cemented together and having different degrees of swelling respectively. When such a laminated foil or sheet with the adhering semiconductor plates is placed into the bath of swelling medium, both foils swell and jointly produce the required breaking stresses.

When using two laminations of different swelling properties, one of them will expand more than the other so that, aside from the tensile stress, a corresponding bending stress is produced. It is preferable to obtain a breaking operation, akin to that employed when breaking a pre-scratched glass pane, by having bending stresses act on both sides of the severance trace and away from that trace. Accordingly, the lamination of higher swelling tendency should be located at the adhesive surface carrying the scored semiconductor plates.

The method can be modified by using, in conjunction with a swelling lamination, a second lamination in which a shrinking process can be produced or released. Suitable for such second laminations are synthetic plastics that were stretched during heat treatment and then frozen in stretched condition. The stretched condition can thereafter be eliminated by heating the lamination with the result that shrinking tensions occur which tend to eliminate the stretch previously imposed upon the material. The carrier foil or lamination for the semiconductor plates therefore can be composed, for example, of a swelling foil whose free surface is adhesively coated for attachment of the semiconductor plates, and a second lamination of shrinkable material as just mentioned. By placing the plate-carrying, laminated foil into a bath for causing one of them to swell, the other foil can be caused to simultaneously shrink by using the swelling bath in a suitably heated condition.

The bath liquid used for swelling the foil body must be so chosen that it does not dissolve the adhesive that cements the semiconductor plates to the foil, at least not during the duration of the swelling process. If desired, however, two different baths can be used successively, one consisting of a liquid that produces swelling in the foil body but does not dissolve the adhesive, whereas the second bath, into which the plate-carrying foil is subsequently immersed, will dissolve the adhesive and thus loosen the plate.

The invention will be further described and explained with reference to embodiments of suitable processing squipment illustrated by way of example on the accompanying drawings in which.

Figure 1:
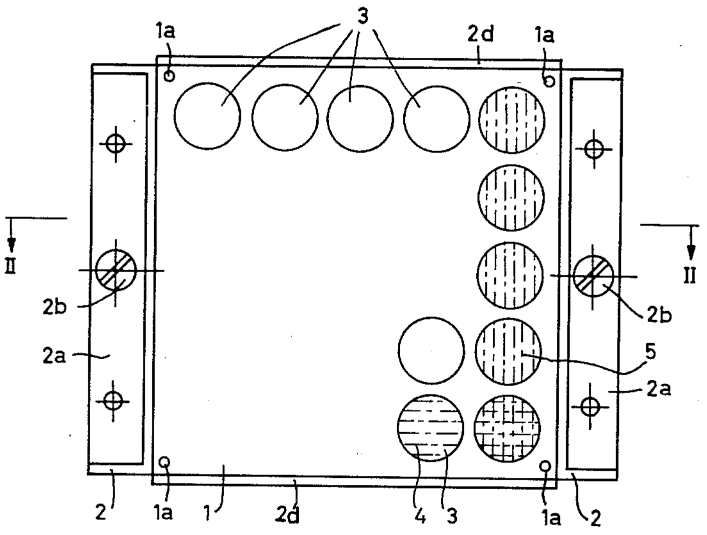
FIG. 1 is a plan view of a supporting structure accommodating a carrier foil with a number of semiconductor plates of relatively large area.
Figure 2:
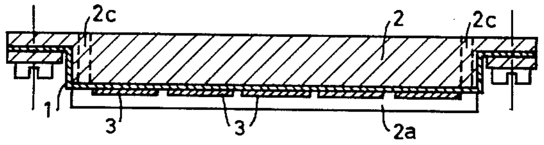
FIG. 2 is a cross section along the line II—II in FIG. 1.

Denoaed by 1 in FIGS. 1 and 2 is a bendable carrier sheet or foil of synthetic plastic, for example polyvinyl chloride, about 0.2 mm. thick. The carrier foil is provided on its exposed top side with an adhesive coating either before or after the foil is placed into the illustrated device. The carrier foil is clamped onto the top surface of a table plate 2 by means of clamping rails 2*a* which are fastened to the table plate 2 by means of bolts 2*b* along a lateral shoulder portion of the table structure. Placed upon the exposed and adhesively coated top surface of the carrier foil 1 are a multiplicity of large-area semiconductor discs 3, for example of monocrystalline silicon, so that they adhere firmly to the foil. Only some of the plates are shown. The plates can be produced, for example, by cutting them from a rod-shaped monocrystalline semiconductor body. A diamond saw can be used for this purpose. Thereafter the plates are lapped down to a prescribed thickness.

An assembly as shown in FIGS. 1, 2 and comprising items 1 to 3 is placed onto the table top of a scoring device for machining severance traces into the exposed surfaces of the adhering plates, such traces are shown at 4 and 5 on some of the semiconductor plates 3 in FIG. 1. The scoring device may be of the type known and often employed for scoring crystalline semiconductor discs prior to breaking them into smaller units, the scoring being done in the conventional manner with the aid of a diamond tool. As shown in FIG. 1, the illustrated severance traces 4 and 5 extend at right angles to each other and jointly constitute a pattern of squares corresponding to the square perimeter and size desired of the smaller semiconductor bodies to be produced from the plates.

Since the foil, after scoring the semiconductor plates, is to be transferred from the table plate 2 to a breaker device, it is desirable to provide the foil, while still mounted on the table plate 2, with reference marks that permit subsequently placing the foil in a definitely predetermined position with respect to the breaker tool. For production of such reference marks, the table plate 2 is provided with respective bores 2*c* at the four corners of the table surface. By pushing a piercing tool or mandrel through the foil into the respective bores 2*c*, corresponding reference markers in form of holes 1*a* are cut into the foil. These holes 1*a* then serve as reference marks for placing the foil onto dowel pins in the breaker device, thus properly orienting the foil with respect to the breaking tool as will be further described hereinafter with reference to the dowel pins 16 in FIG. 6.

When the desired severance traces are scratched or cut into the semiconductor plates, the plate-carrying foil 1 is removed from the supporting plate 2 and is subsequently placed upon a soft supporting pad with the exposed surfaces of the semiconductor plates resting upon the pad. When now pressure is exerted locally upon the rear side of the foil opposite the severance traces 4 or 5, the individual semiconductor plates are subjected to bending stresses along the traces with the result that the plates will break. It is preferable to thus apply breaking pressure to the plates at only one of the severance traces at a time. This can be done simply by rolling a pressure roller over the rear side of the foil, holding the roller axis substantially parallel to the traces. The bending stresses thus exerted upon the semiconductor plates and causing them to break are similar to those that occur when a pre-scored glass pane is placed over the edge of a table top with the scratched trace extending along the edge, and the pane portion protruding beyond the table is subjected to bending force sufficient to break the pane along the trace.

Since the semiconductor plates according to FIG. 1 are provided with patterns of traces intersecting each other at right angles, a complete separation of the small bodies requires passing the above-mentioned roller or other breaking tool successively in two mutually perpendicular directions over the rear side of the carrier foil.

Figure 3:
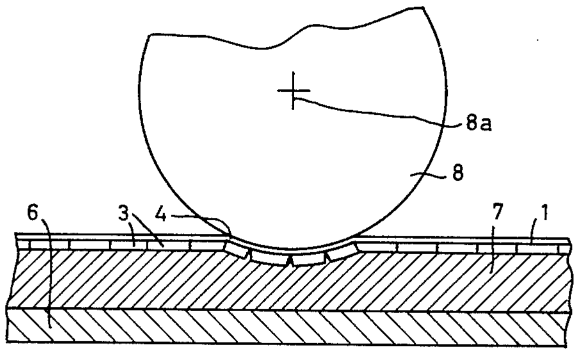
FIG. 3 is a partial and sectional view of a plate-breaking device.

The above-mentioned breaking operation by means of a roller will be further understood from the embodiment shown in FIG. 3. The device comprises a rigid bottom plate 6 on which a soft pad 7 is located. Placed on top of the pad is the foil 1 to whose lower side and semiconductor plates 3 with previously produced severance traces, such as at 4, are still firmly adherent. A cylindrical roller 8 is passed over the foil 1 in rolling engagement therewith. The axis 8*a* of the roller is parallel to the severance traces 4 along which the plates are to break. The dimensions of the roller, as determined by the radial spacing of the roller axis 8*a* from the foil 1, are sufficiently small to cause a small number of semiconductor plates 3 to be locally pressed into the soft pad 7. The amount of deformation is such that the resulting bending stress at the particular severance trace 4 immediately beneath the roller axis 8*a* is large enough to cause breaking of the semiconductor plate.

When using a cylindrical roller of circular cross section as shown in FIG. 3, it is of advantage to give the roller a diameter smaller than twice the distance between adjacent severance traces parallel to the roller axis. As a result, the large-area semiconductor plates are utilized virtually without remainder for separation into small-area bodies, with the only exception of those marginal portions whose area is smaller than desired of the semiconductor bodies to be produced, and a sufficient bending stress at the severance trace in each semiconductor plate is secured although the adjacent severance traces are close to the surface of the pad. For example, it has been found sufficient and advantageous to employ a roller of about 4 mm. diameter for operating with a carrier foil of about 0.2 mm. thickness to produce small semiconductor bodies of square shape having an edge length of about 3 mm.

However, instead of employing a cylindrical roller, the breaking tool may have a polygonal cross section with an edge length corresponding to that of the small-area bodies to be produced from the semiconductor plates. Such a roller is shown at 9 in FIG. 4. The cross section of the roller has the shape of a regular polygon whose edges 10 correspond to the distance between two adjacent severance traces on each semiconductor plate, for example between two traces 4 according to FIG. 1. Such a polygonal roller is passed over the rear side of the carrier foil 1 in such relation thereto that the longitudinal edges of the roller are placed along respective severance traces 4. By applying the necessary pressure against the rear side of the foil, the semiconductor plates are thus subdivided into the individual bodies of the desired ultimate dimensions.

A pressure roller for the purposes of the invention may also have the shape of a cylinder whose peripheral surface is provided with uniformly distributed rib-like projections whose mutual peripheral distance corresponds to the distance between two adjacent severance traces on the semiconductor plates to be broken. A corresponding shape of such a tool can also be produced by machining peripherally distributed recesses, for example of arcuate cross-sectional shape, into the peripheral portion of the roller, each recess extending between two generatrix lines that are spaced from each other a distance equal to that between two adjacent severance traces. In the embodiment shown in FIG. 5, for example, a cylindrical roller 11 has radially protruding longitudinal ribs 11*a* whose peripheral spacing corresponds to the distance between adjacent severance traces. The positioning of the foil 1 relative to the roller 11 is such that one of the ribs 11*a* engages the foil at the rear side and along one of the severance traces.

Figure 4:
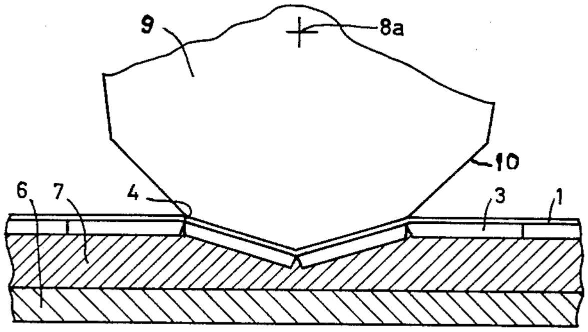
FIGS. 4 and 5 are partial views of modified breaker devices applicable instead of the one shown in FIG. 3.
Figure 5:
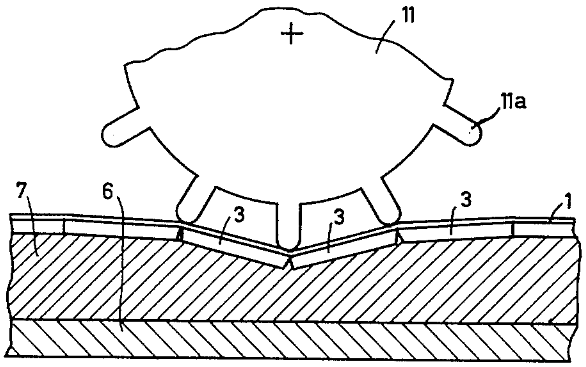

It will be understood from the foregoing that, when using a roller with longitudinal edges as exemplified in FIGS. 4 and 5, it is not only desirable to have the severance traces extend parallel to the roller axis, but that it is also preferred to provide for suitable control of the roller rotation relative to the carrier foil 1 to make certain that the longitudinal edges or projections of the roller press against the correct localities of the carrier foil just opposite the respective severance traces of the semiconductor plates.

For correctly placing the carrier foil with the adhering semiconductor plates upon the table top or pad of the breaker device, the above-mentioned reference markers, such as the holes 1*a* (FIG. 1) at the four corners of the foil can be used. The foil 1 is placed upon the table top 6 of the breaker device shown in FIG. 6 in such a position that corresponding dowel pins 16 of the device pass through the respective marker holes 1*a* of the foil. Advantage can also be taken of the fact that the carrier plate 2, used according to FIGS. 1 and 2 when machining the severance traces into the semiconductor plates, has its upper and lower edges provided with protruding shoulder ledges 2*d* (FIG. 1) against which the lateral edges of the foil 1 can be placed. Such auxiliary ledges can be provided also on the table top 6 of the breaker device according to FIG. 6, and can then be engaged by the corresponding lateral edges of the carrier foil. These foil edges can thus be attached to the breaker device and, if desired, can be clamped fast to the table top 6 of the breaker device in the proper position relative to the roller axis.

Figure 6:
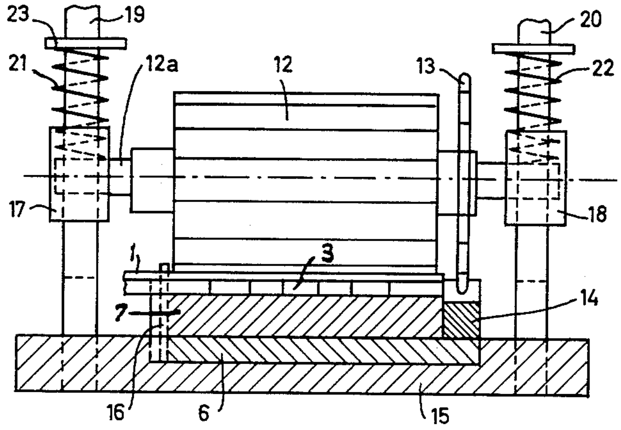
FIG. 6 shows schematically and partially in section another device according to the invention.
Figure 7:
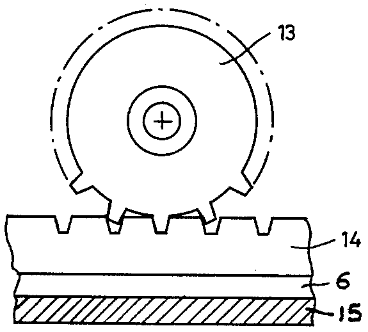
FIG. 7 is a lateral view of components in the device of FIG. 6.

For accurate guidance of the roller with respect to its axis and, as the case may be, relative to its longitudinal edges or projections in relation to the position of the severance traces on the semiconductor plates, the shaft 12*a* of the roller 12 according to FIG. 6 carries a spur gear 13 meshing with a rack 14 (FIGS. 6, 7) rigidly mounted on the base plate 15 of the breaker device. The tooth divisions of rack and spur gear are preferably chosen in accordance with the mutual spacing of the severance traces so that during breaking operation the longitudinal edges of the roller 12, here assumed to be in accordance with the one shown in FIG. 4, are always located opposite and parallel to a severance trace when exerting maximum pressure against the foil 1 and the compressible pad 7. A rack-type guiding device as described may also be directly mounted on, or machined into the table-top structure 6 of the device. Another way of securing the desired control of the breaker tool is to provide the plate-carrying foil 1 with a perforation along a marginal zone for engagement by a spur gear or sprocket wheel fastened on the shaft of the roller; or such gear or wheel may pass through the perforations into a rack-type division of the table top.

The breaker tool 12 has its shaft 12*a* journalled in respective bearings 17 and 18 each guided for vertical displacement on a fixed column 19 or 20 and biased by a helical pressure spring 21 or 22 which is braced against a shoulder ring 23 at the end of the column 19, 20.

In the embodiment shown in FIG. 6, the table top 6 supporting the pad 7 with the plate-carrying foil 1 constitutes a slider and is guided in the supporting structure 15 of the device so as to be displaceable beneath the roller 12 in a direction perpendicular to the plane of illustration. By imparting sliding motion to the table top 6, the semiconductor plates adhering to the foil are sequentially passed beneath the rotating roller; and the rack 14 connected with the slider and driving the roller 12 through the gear 13, simultaneously rotates the roller 12 to perform the breaking operation.

After completing the breaking of the large-area semiconductor plates by employing any one of the modes of operation described, the resulting small-area bodies must be removed from the carrier foils. This can be done simply by immersing or hanging the foils in a suitable bath of solvent. The individual bodies are thus separated from the foil, whereafter the foil and the small bodies are separately located in the bath. When thereafter the liquid is removed from the bath vessel, for example by syphoning, decanting or draining, the semiconductor bodies, cleaned from adhesive, can be taken from the vessel.

Another way of separating the bodies from the foil is to place or hang one or several foils into a screen-type container and to then insert the screening container into the bath. After the small bodies are dissolved away from the carrier foil, the screening container is removed from the bath for removal of the semiconductor bodies and foils.

It will be understood, however, that after completion of the breaking operation, the semiconductor bodies can be kept adherent to the carrier foils for any desired length of time, for example in order to keep them stored or for subjecting all bodies on the common carrier foil to further processing, prior to removing the bodies from the foil by application of the above-mentioned solvent.

When applying the solvent for the purpose of separating the small semiconductor bodies from the carrier foil by placing the foils into screening containers or pockets of screening mesh, it is advisable to employ screening materials of synthetic plastic resistant to the particular solvent employed, in order to give the screening containers a sufficiently long life. For example, polytetrafluoroethylene, available under the trade name Teflon, may be used for producing the screening containers when operating with such solvents as acetone.

Acetone is also applicable as a swelling agent when performing the method of the invention with the aid of sheets, for example of polyvinyl chloride, that can be caused to swell in order to thereby produce the necessary breaking stresses for dividing the large-area semiconductor plates into small bodies along the severance traces. PVC sheets of 0.2 to 0.3 mm. thickness are applicable for this purpose. The foil material used for breaking the attached semiconductor plates mechanically may also consist of polyvinyl chloride. Suitable as material for the compressible pad is rubber, synthetic elastomer or felt.

For breaking the attached plates by shrinking action, a rigid sheet of styrene pre-stretched when heated and then frozen in stretched condition can be used, having a thickness of 0.3 mm. or more. For breaking the scored semiconductor plates, the sheet is heated to thereby return to its original, shrunken condition. Analogously applicable are pre-stretched sheets of polyvinyl chloride which can be caused to shrink by heating them to about 100° C.

We claim:

1. Method of producing semiconductor bodies of relatively small area by severing them from relatively large semiconductor plates, which comprises the steps of attaching at least one large semiconductor plate by one of its faces to an adhesively coated surface of a deformable foil, scoring severance traces in the exposed face of the adhering plate in a trace pattern corresponding to the perimeters of the small area bodies to be obtained, placing the foil onto a soft pad of elastic material with the scored face of the adhering plate engaging the pad, passing a roller under pressure over the rear surface of the foil so as to bend the foil and form breaks in the plate along the traces and simultaneously press the plate into the soft pad so that a portion of the elastic material of the pad is wedged into the breaks along the traces.

2. Method of producing semiconductor bodies of relatively small area by severing them from relatively large semiconductor plates, which comprises the steps of attaching at least one large semiconductor plate by one of its faces to an adhesively coated surface of a deformable foil, scoring severance traces in the exposed face of the adhering plate in a trace pattern corresponding to the perimeters of the small area bodies to be obtained, placing the foil onto a soft pad of elastic material with the scored face of the adhering plate engaging the pad, passing a cylindrical roller having a diameter substantially equal to the distance between two adjacent severance traces under pressure over the rear surface of the foil so as to bend the foil and form breaks in the plate along the traces and simultaneously press the plate into the soft pad so that a portion of the elastic material of the pad is wedged into the breaks along the traces.

3. Method of producing semiconductor bodies of relatively small area by severing them from relatively large semiconductor plates, which comprises the steps of attaching at least one large semiconductor plate by one of its faces to an adhesively coated surface of a deformable foil, scoring in a trace scoring device severance traces in the exposed face of the adhering plate in a trace pattern corresponding to the perimeters of the small area bodies to be obtained, and applying specific reference marks on the foil; placing the foil with the scored semiconductor plate onto a soft pad of elastic material forming part of a plate breaking device with the scored face of the adhering plate engaging the pad in a predetermined position corresponding to the specific reference marks whereby the traces scored on the semiconductor plate are in registry with edges of elevated portions provided on the peripheral surface of a breaking roller forming another part of the plate breaking device, superimposing the edges of the breaking roller under pressure on the rear surface of the foil opposite the locations at which severance traces are scored on the semiconductor plate as the foil and the rotating roller are moved relative to each other so as to bend the foil and form breaks in the plate along the traces and simultaneously press the plate into the soft pad so that a portion of the elastic material of the pad is wedged into the breaks along the traces.

References Cited by the Examiner

UNITED STATES PATENTS

| | | | |
|---|---|---|---|
| 2,970,730 | 2/61 | Schwarz | 225—2 |
| 3,040,489 | 6/62 | Da Costa | 225—2 X |
| 3,099,375 | 7/63 | Schoppee et al. | 225—97 |

ANDREW R. JUHASZ, *Primary Examiner.*

WILLIAM W. DYER, *Examiner.*